(12) United States Patent
Bouillet et al.

(10) Patent No.: US 8,595,244 B2
(45) Date of Patent: Nov. 26, 2013

(54) MATCHING AN ENTRY OF A LIST TO DATA

(75) Inventors: Eric Bouillet, Dublin (IE); Vibhore Kumar, Hawthorne, NY (US); Laurent Mignet, New Delhi (IN); Kuldeep K. Nigam, Gurgaon (IN); Anand Ranganathan, Hawthorne, NY (US); Swati Shah, Harayana (IN); Deepak Turaga, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/285,657

(22) Filed: Oct. 31, 2011

(65) Prior Publication Data

US 2013/0110850 A1    May 2, 2013

(51) Int. Cl.
*G06F 7/00* (2006.01)

(52) U.S. Cl.
USPC .......................................................... 707/755

(58) Field of Classification Search
USPC .................................................... 707/755
See application file for complete search history.

(56) References Cited

U.S. PATENT DOCUMENTS

| | | | |
|---|---|---|---|
| 2004/0133590 A1* | 7/2004 | Henderson et al. | 707/102 |
| 2005/0114771 A1* | 5/2005 | Piehler et al. | 715/536 |
| 2008/0250231 A1* | 10/2008 | Tagawa et al. | 712/220 |

* cited by examiner

*Primary Examiner* — Truong Vo
(74) *Attorney, Agent, or Firm* — William Stock (57) ABSTRACT

A method, system and computer program product for matching an entry of a list to data. The method includes the steps of: generating source code which matches at least a part of said list with said data; compiling said source code into binary code; and determining a match between said list and said data using said compiled binary code wherein at least one of the steps is carried out using a computer device.

13 Claims, 5 Drawing Sheets

List
a
ab
abc
abcd
abce
abcf
abcg
abch
abd
abdg
abdh
abdi
abdj
abdk

Fig. 3(a)

Generated search tree:

MATCHING AN ENTRY OF A LIST TO DATA

BACKGROUND OF THE INVENTION

The present invention generally relates to telecommunications applications which look up phone number prefixes (caller and callee) from the call data records (CDR). More particularly, the present invention matches an entry of a list with CDR data.

Currently, these lists are stored in the form of generic data structures. Generic implementation programs are used to process these generic data structures in order to match them with data such as CDR.

The drawback of the current approach is that the use of generic data structures adds overhead in terms of processing time and memory footprint.

BRIEF SUMMARY OF THE INVENTION

One aspect of the invention provides a method for matching an entry in a list to data, the method including the steps of: generating source code which matches at least a part of said list with said data; compiling said source code into binary code; and determining a match between said list and said data using said compiled binary code, where at least one of the steps is carried out using a computer device.

Another aspect of the invention provides system for matching an entry in a list with to, the system including: a generating unit for generating source code which matches at least a part of said list with said data; a compiling unit for compiling said source code into binary code; and a determining unit for determining a match between said list and said data using said compiled binary code, where at least one of the units is part of a computer device having a processor and a memory.

Another aspect of the invention provides a computer readable article of manufacture tangibly embodying non-transitory computer readable instructions which, when executed, cause a computer to carry out the steps of a method for matching an entry of a list to data, the method including the steps of: generating source code which matches at least a part of said list with said data where (i) said list is sorted and (ii) a search tree is generated using said sorted list; compiling said source code into binary code; and determining a match between said list and said data using said compiled binary code.

The advantage of this approach is that the generated code is optimized for the list of entries, and hence eliminates the overhead in terms of processing time and memory footprint.

Other characteristics and advantages of the invention will become obvious in combination with the description of accompanying drawings, where the same number represents the same or similar parts in all figures.

DETAILED DESCRIPTION OF THE PREFERRED EMBODIMENTS

Detailed description of the invention is made in combination with the following embodiments. A list of prefixes does not change very often (but can still change), and there are many numbers, such as phone numbers, which can be input as a stream and which need to be matched against the list of prefixes to find the longest prefix for each phone number. Finding the longest prefix-match can be especially challenging when the list of prefixes is large, for example in the order of 10,000s, and the stream of phone numbers being input as data is very high rate, for example in the order of hundreds of thousands of phone numbers per second.

There are many scenarios where the longest matching prefix is important to calculate. For example, there may be billing rules that describe the charge for different calls based on the country code, area codes or city codes of the caller and the callee.

The method for matching a list with data according to an embodiment of the invention as described herein is efficient. There are at most m comparisons if the longest key in the list of prefixes is m characters.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
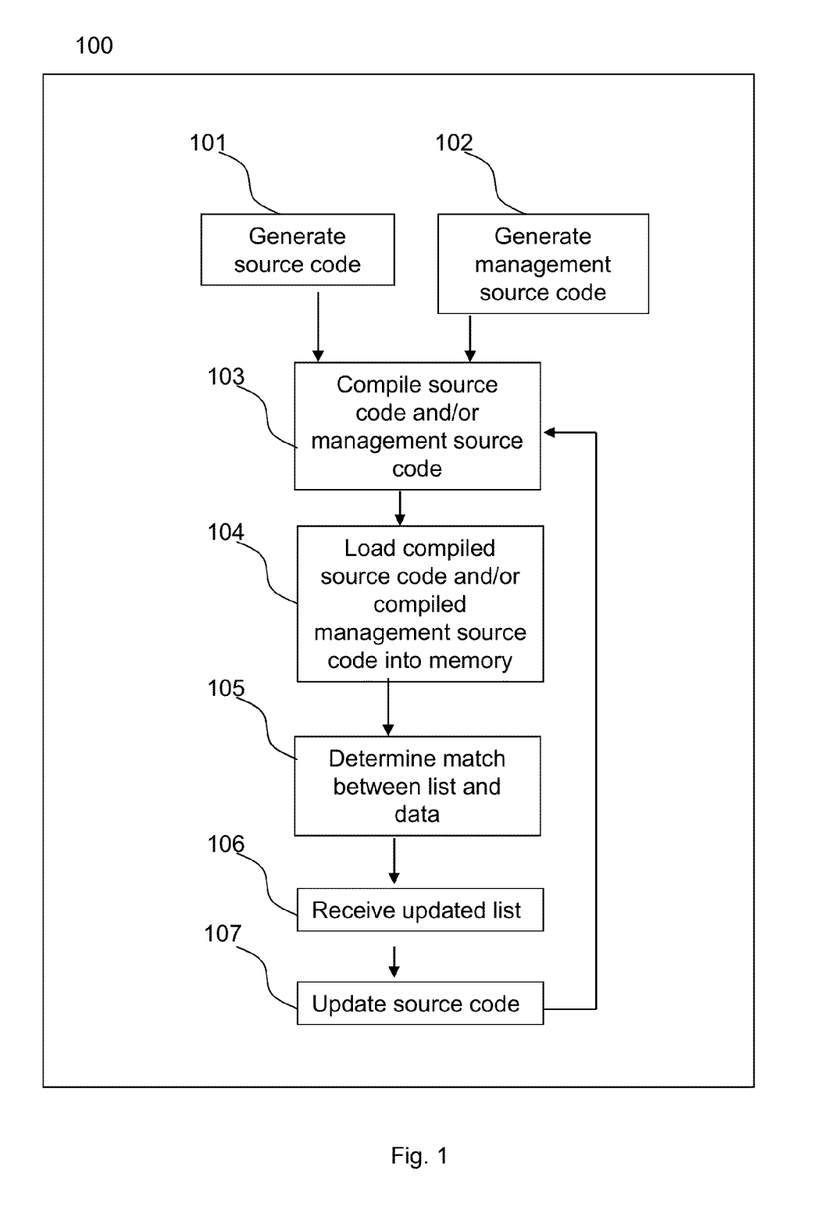
FIG. 1 illustrates a flowchart of a method for matching an entry in a list to data according to an embodiment of the invention.

FIG. 1 is a flowchart illustrating a method for matching an entry in a list with data according to an embodiment of the invention. In step 101, source code is generated which correlates a list with data. Source code can be text written using the format and syntax of a programming language that it is being written in. This source code can include instructions to carry out actions to be performed by a computer, and can be automatically translated to binary machine code that the computer can directly read and execute.

The list or data can contain any information. This information can be any string of numbers or characters. For example, the list can contain information representing phone number prefixes like country/area/city codes such as 9, 914, 9147 and 9148. The data can contain information representing the phone numbers themselves such as 9147660319.

In order for the source code to be able to correlate the list with the data, several techniques can be implemented within the source code. These techniques can match information contained in the list with information contained in the data. For example, if the list is a fixed list of phone number prefixes, the list can be matched with data containing phone numbers according to an embodiment of the present invention. Prefix-matching can be used to determine (i) which elements in the list match the data and (ii) which match is the best match. The best match can be defined as having the longest prefix match. For example, if the data includes the string "9147660319", and the list includes the prefixes 9, 914, 9147, and 9148, then the longest prefix match would be 9147.

Figure 2:
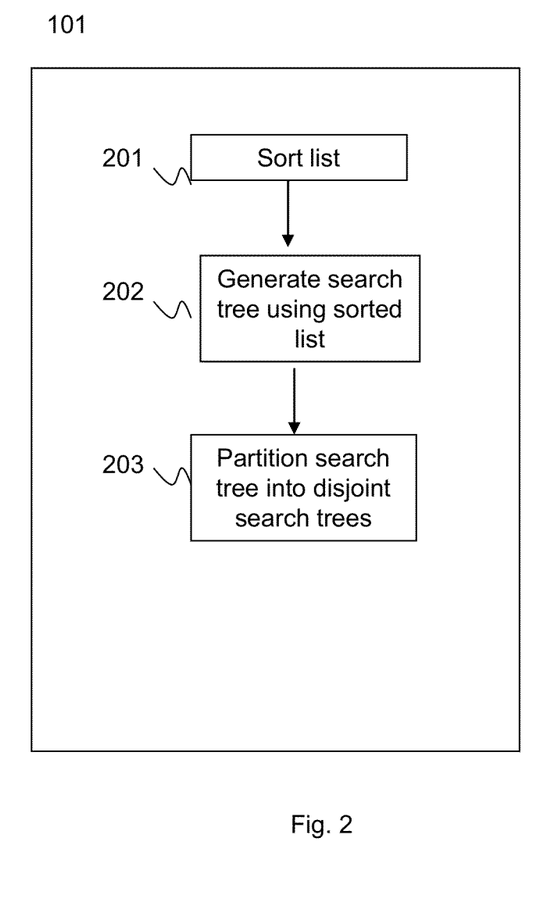
FIG. 2 illustrates a flowchart for generating a source code according to an embodiment of the invention.

FIG. 2 is a flowchart illustrating a method of generating source code which correlates a list of prefixes with data according to an embodiment of the present invention. In step 201, a list is sorted. The list can be sorted based on any criteria such as ascending or descending order, according to an embodiment of the present invention.

Figure 3A:
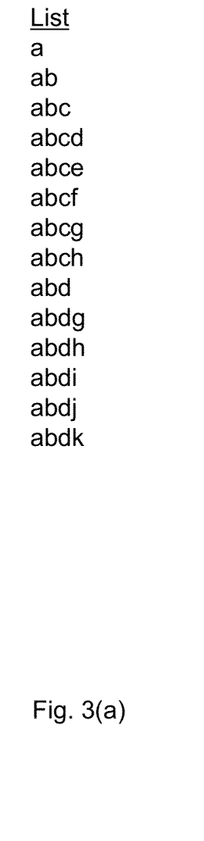
FIG. 3(a) illustrates an example of a list of prefixes according to an embodiment of the present invention.

For example, if the list includes the following information:
a, abc, abcf, abcg, abdh, abdi, abdk, abdj, abdg, ab, abcd, abd, abch, abce, Then the list can be sorted in ascending order as follows:
List
a
ab
abc
abcd
abce
abcf
abcg
abch
abd
abdg
abdh
abdi
abdj
abdk In step 202, a search tree is generated using the sorted list according to an embodiment of the present invention.

Figure 3B:
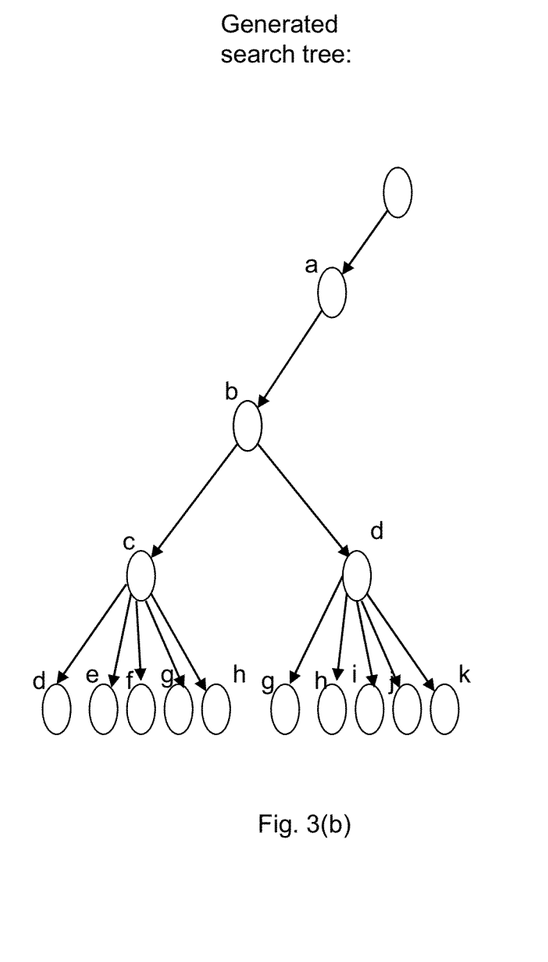
FIG. 3(b) illustrates a search tree according to an embodiment of the present invention.

FIG. 3(*b*) illustrates a search tree generated using a sorted list according to an embodiment of the present invention. The sorted list used in this case is as follows: ab, abc, abcd, abce, abcf, abcg, abch, abd, abdg, abdh, abdi, abdj, abdk. The search tree is generated by finding a number of unique characters in the first position of each of the prefixes in the list, which will represent the characters to test against in the first switch statement (in this example, just "a"), and creating k number of nodes in the first level of the tree where k=the number of unique characters found in the first position. For example, there is only one (k=1) unique characters (a) in the first position of each of the prefixes in this list. Therefore, the search tree which is generated from this list has one node in the first level. Then finding a number of unique characters in the second position of each of the prefixes in the list, and creating l number of nodes in the second level of the tree where l=the number of unique characters found in the second position. For example, there is only one (k=1) unique characters (b) in the second position of each of the prefixes in this list. Therefore, the search tree which is generated from this list has one node in the second level. This routine is repeated m times, where m=the number of positions in the longest prefix in the list.

The switch statements generated from the search tree scan the input strings of data (such as phone numbers) one character at a time. The switch statement then returns the value of the longest matching prefix.

For example, consider the following prefixes:
a
ab abc
abcd
abce
abcf
abcg
abch
abd
abdg
abdh
abdi
abdj
abdk In this case, the switch statement can be generated as follows. It should be noted that this switch statement is actually a function that returns an index number for the longest matching prefix.

```
#include<cstdlib>
extern "C" int64_t maxLengthMatchToObjectId_long( const char* theKey ) {
  const char* x = theKey;
  int64_t r = -1; // Default value (key not found).
  switch(*x++){
    case 'a':
      r = 1; // the longest matching prefix found so far
      switch(*x++){
        case 'b':
          r = 2;; // the longest matching prefix found so far
          switch(*x++){
            case 'c':
              r = 3;
              switch(*x++){
                case 'e':
                  r = 5;
                  break;
                case 'h':
                  r = 8;
                  break;
                case 'g':
                  r = 7;
                  break;
                case 'd':
                  r = 4;;
                  break;
                case 'f':
                  r = 6;;
                  break;
                default:
                  break;
              };
              break;
            case 'd':
              r = 9;;
              switch(*x++){
                case 'f':
                  r = 11;;
                  break;
                case 'j':
                  r = 14;;
                  break;
                case 'i':
                  r = 13;;
                  break;
                case 'j':
                  r = 10;;
                  break;
                case 'k':
                  r = 12;;
                  break;
                default:
                  break;
              };
              break;
            default:
              break;
          };
          break;
        default:
          break;
      };
      break;
    default:
      break;
  };
  return r;
}
```

In step 203, a search tree generated from a list of prefixes can be split into one or more disjoint search trees according to an embodiment of the present invention. Each of the disjoint search trees can then transformed into nested switch statements. The number of case statements included in a tree can be limited by a pre-defined number to limit the size of the generated source code. For example, a tree of switch statements can be created and broken down so that each tree includes a maximum of five case statements (nodes in the tree).

Source code can be generated where the actual matching algorithm is hard-coded in the source code. The generated source code can take the form of a sequence of nested switch statements.

More specifically, an algorithm for generating the switch statement can be as follows:

1. Set the counter for the current file=0
2. Find the list of unique characters in the first position of all the prefixes. This will represent the characters to test against in the first switch statement (in this example, just 'a').
3. For i=0 to (length of longest prefix−1) do:
   a. Generate a switch statement for these unique characters in position i+1, where a separate case exists for each of the unique characters. Generate the case statements and increment the counter for the current file by 1 for each case statement. If the counter>file_threshold, start a new file and set counter for that file=0.
   b. For each of unique character in position i, find the list of unique characters in position i+1.

For example, consider the following prefixes:
a
ab
abc
abcd
abce
abcf
abcg
abch
abd
abdg
abdh
abdi
abdj
abdk If the length of the longest prefix were set to 8, then the aforementioned search tree would be split into 2 disjoint search trees. The following source code would be generated for the first source code segment.

```
#include<cstdlib>
extern "C" int64_t maxLengthMatchToObjectId_long( const char* theKey ) {
  const char* x = theKey;
  int64_t r = -1; // Default value (key not found).
  switch(*x++){
```

-continued

```
case 'a':
    r = 1; // the longest matching prefix found so far
    switch(*x++){
        case 'b':
            r = 2;; // the longest matching prefix found so far
            switch(*x++){
                case 'c':
                    r = 3;
                    switch(*x++){
                        case 'e':
                            r = 5;
                            break;
                        case 'h':
                            r = 8;
                            break;
                        case 'g':
                            r = 7;
                            break;
                        case 'd':
                            r = 4;;
                            break;
                        case 'f':
                            r = 6;
                            break;
                        default:
                            break;
                    };
                    break;
```

Here, there are 8 case statements, therefore this marks the end of the first source code segment and a second source code segment begins where the first source code segment left off:

```
#include<cstdlib>
extern "C" int64_t maxLengthMatchToObjectId_long( const char* theKey ) {
const char* x = theKey;
int64_t r = -1; // Default value (key not found).
switch(*x++){
    case 'd':
        r = 9;;
        switch(*x++){
            case 'f':
                r = 11;;
                break;
            case 'j':
                r = 14;;
                break;
            case 'i':
                r = 13;;
                break;
            case 'j':
                r = 10;;
                break;
            case 'k':
                r = 12;;
                break;
            default:
                break;
        };
        break;
    default:
        break;
};
break;
};
return r;
}
```

In step 102, management source code is generated which manages the execution of the of source code segments generated in step 202. The generated management source code can (i) define the overall function that is invoked and (ii) invoke sub-functions defined in other code files. As seen in step 203, the number of case statements included in a tree can be limited by a pre-defined number to limit the size of the generated source code. For example, a tree of switch statements can be created and broken down so that each tree includes a maximum of eight case statements (nodes in the tree). This results in three files: master, map1, and map2. The master file can be the root of the tree which has two nodes that call functions that link to the trees in map1 and map2. The resulting three files are compiled in parallel using a pool of threads. This results in separate object files all of which in the end will be linked in a single library. The advantage of separating the search tree into disjoint search trees is a reduced time to compile the source code.

Below is an example of master tree of switch statements (root) which calls sub-trees of switch statements (as function calls).

```
#include<cstdlib>
int64_t_maxLengthMatchToObjectId_long_1(const char*);
int64_t_maxLengthMatchToObjectId_long_2(const char*);
extern "C" int64_t maxLengthMatchToObjectId_long( const char* theKey ) {
const char* x = theKey;
int64_t r = -1; // Default value (key not found).
switch(*x++){
    case 'a':
        r = 1;;
        switch(*x++){
            case 'b':
                r = 2;;
                switch(*x++){
                    case 'c':
                        r = _maxLengthMatchToObjectId_long_1(x);
                        break;
                    case 'd':
                        r = _maxLengthMatchToObjectId_long_2(x);
                        break;
                    default:
                        break;
                };
                break;
            default:
                break;
        };
        break;
    default:
    break;
};
return r;
}
```

The following is an example of Map1.c (which contains maxLengthMatchToObjectId_long_1). Since the map file is simple, it contains a single switch statement, but it can be a whole tree of switch statements under the master tree (map.c).

```
#include<cstdlib>
int64_t_maxLengthMatchToObjectId_long_1( const char* theKey ) {
const char* x = theKey;
int64_t r = 3;;
switch(*x++){
//5
    case 'e':
        r = 5;;
        break;
    case 'h':
        r = 8;;
        break;
    case 'g':
        r = 7;;
```

```
        break;
    case 'd':
        r = 4;;
        break;
    case 'f':
        r = 6;;
        break;
    default:
break;
};
return r;
}
```

The following is an example of Map2.c (which contains maxLengthMatchToObjectId_long_2)

```
#include<cstdlib>
int64_t_maxLengthMatchToObjectId_long_2( const char* theKey ) {
const char* x = theKey;
int64_t r = 9;;
switch(*x++){
    case 'f':
        r = 11;;
        break;
    case 'j':
        r = 14;;
        break;
    case 'i':
        r = 13;;
        break;
    case 'j':
        r = 10;;
        break;
    case 'k':
        r = 12;;
        break;
    default:
break;
};
return r;
}
```

In step 103, generated source code and/or generated management source code can be compiled into a dynamic linked library according to an embodiment of the present invention. The generated source code and/or generated management source code can also be compiled into executable code.

In step 104, the library is be loaded into memory according to an embodiment of the present invention. The function that the library exports (for matching data against a list of prefixes) can be invoked when new data is received. It should be noted that, at runtime, an old library can be unloaded and a new library can be loaded and used for purposes of matching.

In step 105, the compiled source code is executed in order to determine a match between the list and data according to an embodiment of the present invention.

In step 106, a new list of prefixes is received according to an embodiment of the present invention. The new list of prefixes can be an updated list where (i) at least one prefix has been added to or deleted from the list, (ii) the list has been sorted in a different order or using different criteria, or (iii) any other changes made to the list.

In step 107, new source code is generated based on a new or updated list of prefixes. New management source code can also be generated based on a new or updated list of prefixes.

Figure 4:
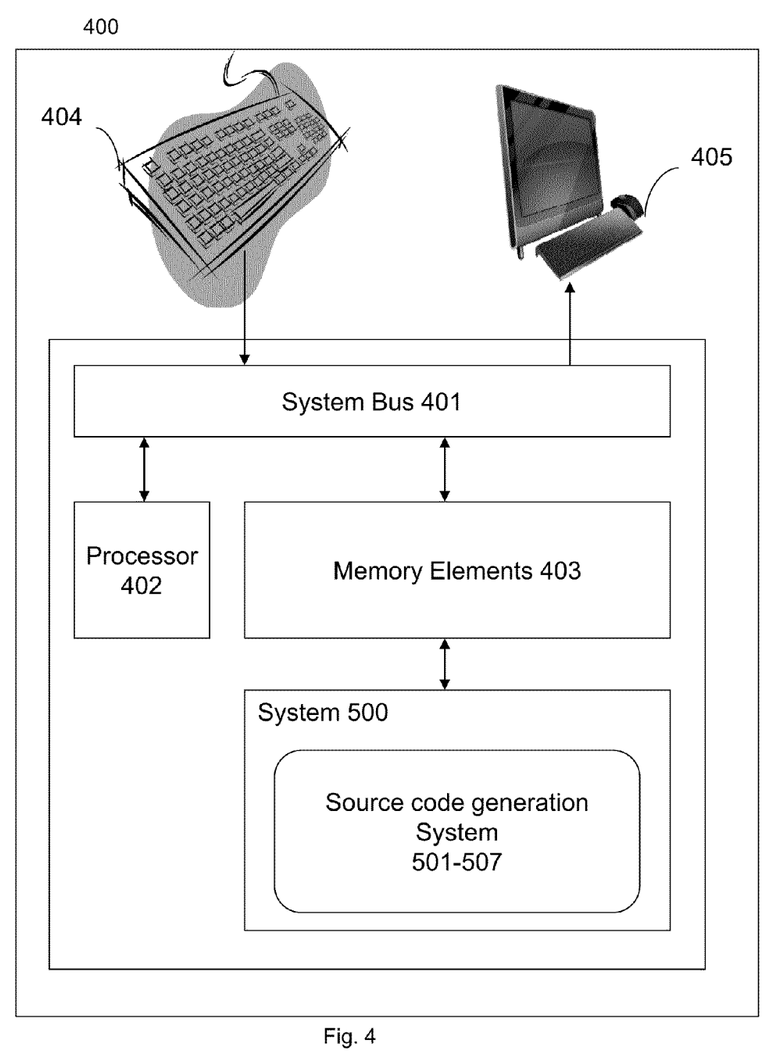
FIG. 4 illustrates a block diagram of a system for matching an entry in a list with data according to an embodiment of the invention.

FIG. 4 is a block diagram of a system (hereinafter "system") 400 for matching an entry in a list to data in accordance with another embodiment of the present invention. The system 400 can include at least one processor 402 coupled to memory elements 403 through a system bus 401. As such, the system 400 can store program code within the memory elements 403. The processor 402 can execute the program code accessed from the memory elements 403 via the system bus 401. In one aspect, for example, the system 400 can be implemented as computer that is suitable for storing and/or executing program code. It should be appreciated, however, that the system 400 can be implemented in the form of any system comprising a processor and memory that is capable of performing the functions described within this specification.

The memory elements 403 can include one or more physical memory devices such as, for example, local memory (not shown) and one or more bulk storage devices (not shown). Local memory refers to random access memory or other non-persistent memory device(s) generally used during actual execution of the program code. Bulk storage device(s) can be implemented as a hard disk drive (HDD), solid state drive (SSD) or other persistent data storage device. The system 400 also can include one or more cache memories (not shown) that provide temporary storage of at least some program code in order to reduce the number of times program code must be retrieved from bulk storage device during execution.

Input/output (I/O) devices such as a keyboard 404, a display 405, and a pointing device (not shown) optionally can be coupled to the system 400. The I/O devices can be coupled to the system 400 either directly or through intervening I/O controllers. Network adapters also can be coupled to the system 400 to enable the system 400 to become coupled to other systems, computer systems, remote printers, and/or remote storage devices through intervening private or public networks. Modems, cable modems, and Ethernet cards are examples of different types of network adapters that can be used with the system 400.

Figure 5:
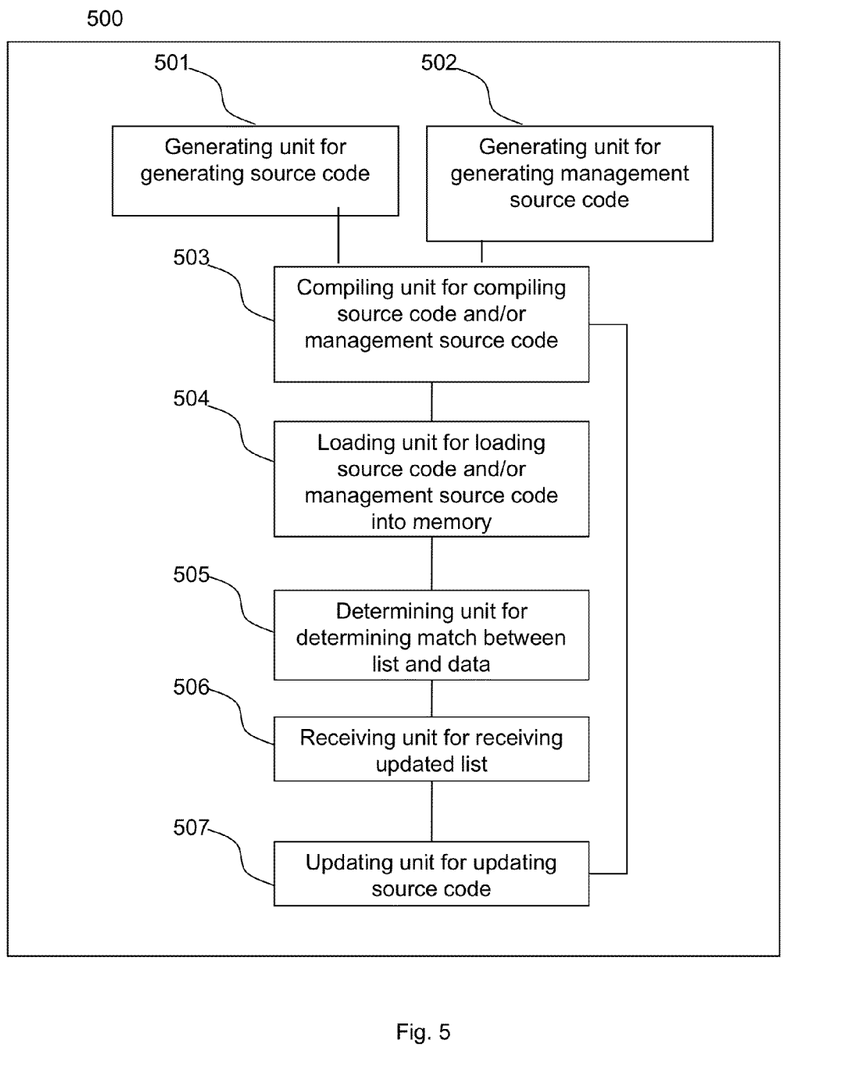
FIG. 5 illustrates a system for matching an entry in a list to data according to an embodiment of the invention.

As pictured in FIG. 4, the memory elements 403 can store the system 500, including the source code generating system 501-507. The processor can execute the system 500 to implement the processes and methods described herein.

FIG. 5 shows the system 500 for matching an entry in a list to data according to a preferred embodiment of the present invention. In the preferred embodiment shown in FIG. 5, system 500 can include the following modules 501-507.

A generating unit 501 generates source code which matches an entry within a list with data. In order for the source code to be able to correlate the list with the data, several techniques can be implemented within the source code. These techniques can match information contained in the list with information contained in the data.

In addition, the generating unit 501 can (i) sort a list, (ii) generate a search tree using the sorted list, (iii) split a search tree generated from a list of prefixes into one or more disjoint search trees according to an embodiment of the present invention. The list can be sorted based on any criteria such as ascending or descending order.

A generating unit 502 generates management source code which manages the execution of the of source code segments generated by the generating unit 501. The generated management source code can (i) define the overall function that is invoked and (ii) invoke sub-functions defined in other code files.

A compiling unit 503 compiles generated source code and/or generated management source code into a dynamic linked library or any other executable code according to an embodiment of the present invention.

A loading unit 504 loads the compiled generated source code and/or compiled generated management source into memory according to an embodiment of the present invention.

A determining unit 505 executes the compiled source code and/or compiled management source code in order to determine a match between the list and data according to an embodiment of the present invention.

A receiving unit 506 receives a new list of prefixes according to an embodiment of the present invention. An updating unit 507 generates new source code based on a new or updated list received by the receiving unit 506.

Like numbers have be used to refer to the same items throughout this specification. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The basic principle of the invention is matching a list with data. Detailed description of the invention is made in combination with the following embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A method of matching an entry in a list to data, the method comprising the steps of:
   receiving said list, wherein (i) said entry in a list comprises phone number prefixes and (ii) said data comprises phone numbers;
   generating source code, based on said received list, which matches at least a part of said list with said data, wherein (i) said list is sorted, (ii) a search tree is generated by finding a number of unique characters in each position of the phone number prefixes in said sorted list, and (iii) said source code comprises a nested switch statement which represents said search tree;
   wherein said generating step further comprises the step of:
      partitioning said search tree into a plurality of disjoint search trees, wherein (i) said source code comprises a plurality of source code segments and (ii) each of said plurality of source code segments match at least a portion of said list to one of said plurality of disjoint search trees;
   compiling said source code into binary code; and
   determining a match between said list and said data using said compiled binary code;
   wherein at least one of the steps is carried out using a computer device.

2. The method according to claim 1 further comprising the step of independently compiling each of said plurality of source code segments.

3. The method according to claim 1 further comprising the step of determining whether any of said plurality of disjoint search trees are common to each other.

4. The method according to claim 1, further comprising the step of:
   generating a management source code segment which manages the execution of said plurality of source code segments.

5. The method according to claim 1, wherein said binary code is loaded into memory at runtime of a program.

6. The method according to claim 1, wherein (i) said list is a concatenation of a first list and a second list, (ii) said generating step matches said first list with said data and (iii) said generating step matches at least a portion of said second list with said data.

7. The method according to claim 1, further comprising the steps of:
   receiving an updated list; and
   updating said source code using said updated list.

8. A system for matching an entry in a list to data, the system comprising:
   a receiving unit for receiving said list, wherein (i) said entry in a list comprises phone number prefixes and (ii) said data comprises phone numbers;
   a generating unit for generating source code which matches at least a part of said list with said data;
   a sorting unit for sorting said list;
   a unit for generating a search tree by finding a number of unique characters in each position of the phone number prefixes in said sorted list;
   a partitioning unit for partitioning said search tree into a plurality of disjoint search trees,
   wherein (i) said source code comprises a plurality of source code segments and (ii) each of said plurality of source code segments match at least a portion of said list to one of said plurality of disjoint search trees;
   a compiling unit for compiling said source code into binary code; and
   a determining unit for determining a match between said list and said data using said compiled binary code,
   wherein said generation unit is further configured to generate a nested switch statement which represents said search tree and wherein at least one of the units is part of a computer device having a processor and a memory.

9. The system according to claim 8 further comprising a determining unit for determining whether any of said plurality of disjoint search trees are common to each other.

10. The system according to claim 8, further comprising:
    a generating unit for generating a management source code segment which manages the execution of said plurality of source code segments.

11. The system according to claim 8, wherein the system is configured to load said binary code into memory at runtime of a program.

12. The system according to claim 8, further comprising:
    a receiving unit for receiving an updated list; and
    an updating unit for updating said source code using said updated list.

13. A computer readable article of manufacture tangibly embodying non-transitory computer readable instructions which, when executed, cause a computer to carry out the steps of a method for matching an entry in a list to data, the method including the steps of:
    receiving said list, wherein (i) said entry in a list comprises phone number prefixes and (ii) said data comprises phone numbers;
    generating, based on said received list, source code which correlates at least a part of said list with said data, wherein (i) said list is sorted, (ii) a search tree is generated by finding a number of unique characters in each position of the phone number prefixes in said sorted list and (iii) said source code comprises a nested switch statement which represents said search tree;
    wherein said generating step further comprises the step of:
       partitioning said search tree into a plurality of disjoint search trees,
       wherein (i) said source code comprises a plurality of source code segments and (ii) each of said plurality of source code segments match at least a portion of said list to one of said plurality of disjoint search trees;
    compiling said source code into binary code; and
    determining a match between said list and said data using said compiled binary code.

* * * * *